Nov. 13, 1951  R. R. BAXTER ET AL  2,574,685
SEWAGE TREATMENT SYSTEM
Filed Sept. 21, 1946
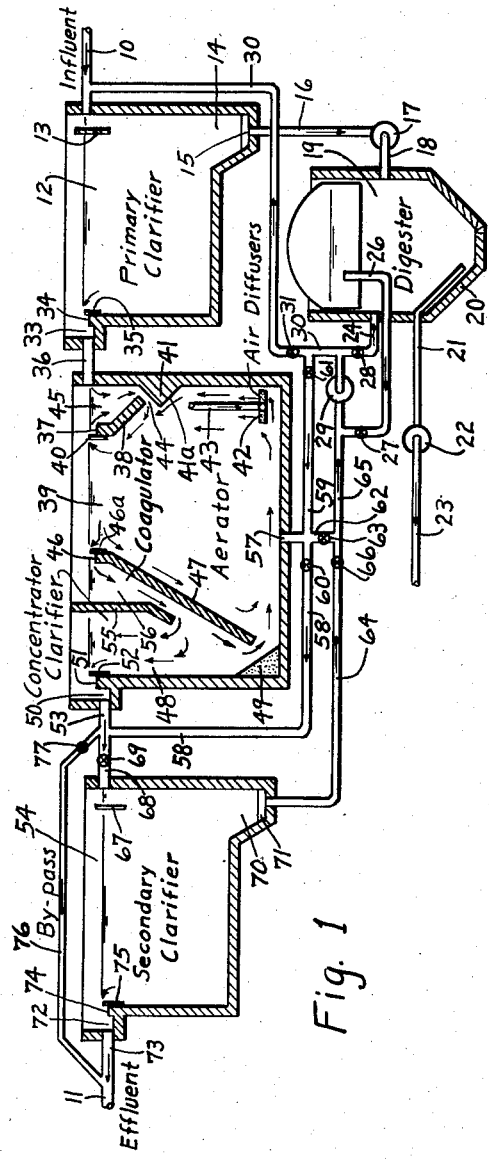
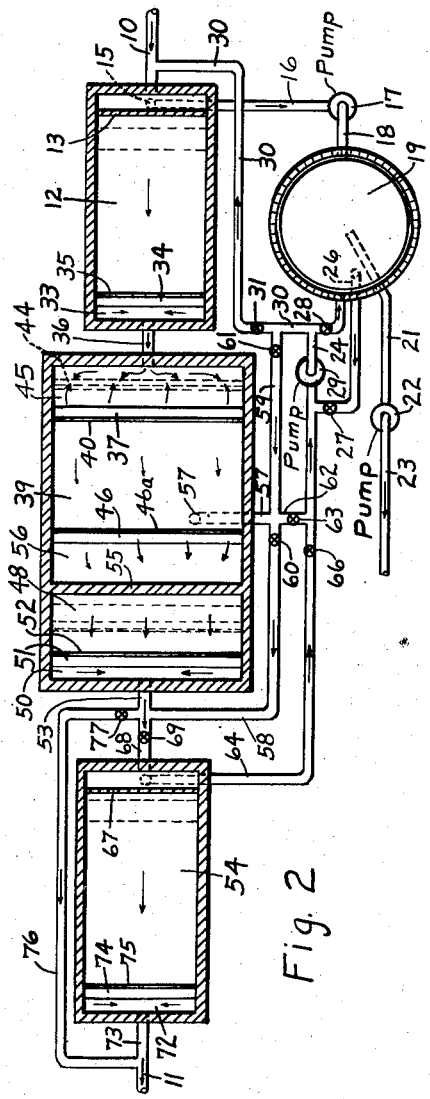
INVENTORS
ROBERT R. BAXTER
BY MARTIN A. MILLING
Lockwood, Goldsmith & Galt
ATTORNEYS.

Patented Nov. 13, 1951

2,574,685

UNITED STATES PATENT OFFICE 2,574,685

SEWAGE TREATMENT SYSTEM

Robert R. Baxter and Martin A. Milling, Anderson, Ind.

Application September 21, 1946, Serial No. 698,436

11 Claims. (Cl. 210—8)

This invention relates to sewage treatment and has for its object the provision of an improved process with apparatus for performing the treatment of sewage and similar waste liquors. More particularly the invention contemplates the provision of an improved process for effecting the removal of finely divided, suspended and dissolved putrescible matter from sewage and similar waste liquors.

The invention further contemplates the provision of an improved method for the application of raw or settled sewage to aeration chambers in such a manner that better mixing results and neither stale liquor nor sludge deposits occur in the influent channel.

A further object of the invention is to provide an aeration chamber with an improved sludge concentrator and clarifier whereby activated sludge is uniformly returned to and mixed with the contents of the aeration chamber in such a way that the environment for biological life in the aerator liquor will remain uniform and favorable for sewage treatment and clarification.

Still another object of the invention is to prevent the deposition of sludge on the bottom of the aeration chamber by causing and regulating a cycling flow across the bottom of this chamber.

Other objects and features of the invention will be set forth more fully hereinafter.

The full nature of the invention will be understood from the accompanying drawings and the following description and claims:

In the drawings, Fig. 1 is a longitudinal, central, sectional, semi-diagrammatic view through apparatus embodying features of the invention and by which the process invention may be utilized.

Fig. 2 is a transverse or horizontal, sectional, semi-diagrammatic view taken approximately in the plane of the static liquid level in the device.

For a better understanding of the process invention herein disclosed, reference will first be had to the apparatus included herein.

In Figs. 1 and 2 of the drawings, 10 indicates a raw sewage influent line and 11 an effluent line. 12 indicates a conventional primary clarifier supplied by influent line 10. In this chamber is baffle 13 which is disposed forwardly of the intake so as to spread out the sewage flow through the clarifier and avoid channeling or short circuit flow.

Certain of the solids which settle to the bottom of clarifier 12 may be raked by sludge scrapers (not shown) to and collected in the widthwise sump 14, from where said solids may be removed through outlet 15, conduit 16 and pump 17 discharging intermediately as at 18 to a digestion chamber 19 having a frusto-conical bottom 20. A sump suction line 21 terminates near the bottom 20 and pump 22 connected to line 21 discharges through line 23 to sludge beds (not shown) or to another suitable place for sludge disposal.

Digester 19 includes another supply line 24 to which further reference will be had. A supernatant liquor draw off line 26 is also provided and valve 27 controls same while valve 28 controls intake 24. Therebetween and connected to both is pump 29. A line 30 controlled by valve 31 connects at opposite ends to said pump 29 discharge side and to influent line 10.

Thus when valves 28, 61, 63 and 66 are closed and valves 27 and 31 are opened, supernatant liquor from the digester is returnable to the clarifier 12 by pump 29. Similarly by opening or closing the proper valves supernatant liquor may be pumped through lines 59 and 57 to aerator 39 or through lines 59 and 58 to clarifier 54.

The primary clarifier 12 is herein shown elongated and widthwise disposed therein near the end opposite the intake is the outlet channel 33 and separated by wall 34 with which is associated weir 35. Outlet channel 33 includes central outlet 36.

Reference will now be had to the central portions of both figures wherein there is illustrated an aerating chamber 39 also of elongated character and having a widthwise partition 37 near its intake which partition is inclined downwardly and toward the upstream end of the chamber as indicated at 38.

An adjustable, widthwise weir 40 determines the intake level and the rate of liquid flow over the weir from chamber 39 to channel 45. The chamber 39 adjacent the lower end of partition 37—38 includes inwardly directed width-wide abutment 41 spaced from said lower end. The result is the discharge enters the main portion of chamber 39 appreciably below the top thereof.

Air diffusers 42 are positioned near the bottom of the aeration chamber appreciably below the abutment 41 level and are supplied with air under pressure by suitable means (not shown) and line 43. This air rises and carries the liquid with it. In so doing the lower face 41a of abutment 41 serves as a deflector so that the rising air and liquid pass over the the throat and effect an effector action accelerating the discharge from the preliminary entrance channel 45. Since this is a pressure system the aerated liquid rises, as described, and part of it flows "upstream," as it were, over weir 40 into channel 45 effecting cycling.

Disposed in spaced relation to weir 40 and and downstream thereof is a widthwide disposed weir 46a associated with the partition wall 46 having inclined portion 47 directed downwardly and downstream, as it were, and having its lower end spaced from the sloping bottom 49 of the concentrator-clarifier chamber 48 into which is interposed baffle wall 55 forming coagulator chamber 56.

At the downstream end of the concentrator-clarifier chamber 48 is widthwise channel 50 formed by wall 51 upon which is adjustably mounted widthwide weir 52. Channel 50 has central outlet 53 discharging to a secondary clarifier 54.

The bottom of chamber 39 is provided with a conduit 57. This conduit has two branches 58 and 59 each controlled by a valve 60 and 61, respectively, and a third branch 62 controlled by valve 63. Branch 58 connects to outlet 53. Branch 59 connects to line 30 between valves 28 and 31. Branch 62 connects to lines 64 and 65, the former including valve 66 and the latter connecting to pump 29 ahead of valve 27 in line 26.

Thus with valves 66 and 61 opened and valves 63, 60, 27, 28 and 31 closed, sludge from clarifier 54 may be pumped by pump 29 using suction line 64 and 65 and discharge line 30, 59 and 57 to aerator 39. Or with the proper valves opened or closed, as the case may demand, liquid may be drawn from aerator 39 and discharged by gravity through line 58 to clarifier 54, or through pump 29 and discharge line 24 to digester or through discharge line 30 to clarifier 12.

The conventional secondary clarifier 54 includes widthwide baffle 67 near the intake 68. Line 68 connects to outlet 53 and is controlled by valve 69. Clarifier 54 includes sump 70 having inclined bottom 71 and conduit 64 connects thereto.

Chamber 54 at the downstream end includes widthwide channel 72 having outlet 73 to effluent 11. Wall 74 forms said channel and adjustably associated therewith is a widthwide weir 75. A by-pass line 76 controlled by valve 77 is connected at opposite ends to outlet 53 and effluent 11.

The foregoing constitutes in effect a recitation of parts and connections of the apparatus herein disclosed. Operation thereof and the method employed will now be more fully set forth.

The piping or conduit system disclosed permits of varied operations. Arrows on such piping, in general, indicates direction of flow. Sludge and liquid withdrawal from the chambers are disclosed. Also reverse flow of sludge to the aerator is possible. Cycling in the aerator itself is shown by the arrows. The function of the baffles in directing flow and in effecting the return of mixed liquor solids and the mixing of these solids and the incoming sewage with the contents of the aeration chamber is also disclosed.

Briefly the operation is as follows:

The raw sewage first enters a conventional primary clarifier 12. The primary clarifier preferably should have a capacity sufficient to give an average detention period of about one hour, but this period may be increased or decreased depending upon the settling characteristics of the raw sewage solids.

The solids which settle to the bottom can be raked, either manually or by motor driven mechanical scrapers or other means (not shown) to a sludge hopper or sump 14 from where they can be drained or pumped to the separate sludge digestion tank 19. The primary clarifier may be rectangular in shape, as shown on the accompanying drawing, or it may be circular in shape. The primary clarifier may also be of a combination clarifier digester type similar to the "Imhoff" two story tank.

From the primary clarifier the settled sewage flows into the aerator influent channel 45. This channel may be V-shaped as shown and with a slotted opening 44 at the bottom. The opening may extend across the entire width of the aerator or only part way across along the several slotted openings extending along the length of the channel through which raw or settled sewage may enter the aeration chamber. The distribution of the incoming sewage along the length of the aeration unit can be accomplished by causing the sewage to flow laterally in the influent channel 45 and then through the slotted opening 44 all along its entire length.

This lateral flow is effected by frictional resistance to flow through the slot which causes the surface of the liquor at the point of influent to the channel to be slightly higher than at other points in the channel.

To increase the frictional resistance to flow through the slotted opening 44 as well as to effect better mixing of the incoming sewage with the liquid contents of the aeration chamber, hereinafter called "mixed liquor," a portion of this mixed liquor may be returned to the influent channel 45.

This is done by making use of the upward velocity of the circulating mixed liquor to effect a slight suction or ejector action at the slotted opening 44 causing the water surface in the influent channel 45 to be slightly lower than the water surface in the aerator 39. Thus by adjusting the height of weir 40 the amount of mixed liquor to be returned to the influent channel 45 can be regulated as desired.

The aerator may be circular or rectangular in shape and may have a capacity sufficient to give a detention period of between one and eight hours depending upon the biochemical oxygen demand (B. O. D.) of the sewage to be treated. Good results in treating domestic sewage using aeration periods of one hour and less have been obtained with this process.

A common air diffuser 42 may extend the entire width of the aerator 39 and provide a source of air for aeration and circulation of the mixed liquor. The air diffusers may be of any suitable construction and should be located near or at the bottom of the aeration chamber 39 along the influent channel side of the chamber. The amount of air required will vary depending upon the B. O. D. of the sewage but very good results have been obtained treating domestic sewage with this process using 0.5 cubic feet of air and less per gallon of sewage.

The process includes the continuous and automatic return of sludge from concentrator-clarifier chamber 48. The partition wall 46—47 which separates the aeration chamber from the concentrator-clarifier chamber has an opening at the bottom through which mixed liquor solids, which settle to the bottom of the concentrator-clarifier chamber, may re-enter the aeration chamber.

The baffle wall may be constructed vertically or on a slope. If constructed vertically the bottom of the concentrator-clarifier chamber should slope towards the aeration chamber in order to accommodate the return of sludge. If the partition wall is constructed on a slope, as shown in the accompanying drawings, there will be more capacity in the aerator and it will also avoid the necessity of having a long sloping bottom in the concentrator-clarifier.

There is a downward flow on both sides of partition wall 46—47 as indicated by the arrows on the drawing. The downward flow on the upstream side of partition wall 46—47 effects a slight suction or ejector action in passing the opening at the bottom of said partition wall. This, together with the downward flow on the downstream side of this partition wall accelerates settling and the return of mixed liquor solids to the aeration chamber.

As a result of the circulating velocity of the mixed liquor caused by aeration, the elevation of the water surface would be slightly higher on the aerator side of the weir 46a when the weir is raised above the water surface than on the coagulator chamber 56 side of this weir. Therefore, when the weir is lowered below the water surface, mixed liquor will flow over weir 46a into coagulator 56 where light and finely divided solids are coagulated. A detention period of 10 to 20 minutes is usually adequate for effective coagulation.

All the mixed liquor that flows over the weir, in excess of the rate of incoming sewage flow, will automatically return to the aerator through the slotted opening at the bottom of the partition wall 46—47 and pass along the bottom of the aerator. The rate of flow over the weir 46a as well as the velocity of flow across the bottom of the aerator can thus be regulated by raising or lowering the elevation of weir 46a.

Best results are usually obtained when the elevation of the weir is adjusted so that the quantity of the flow over the weir is sufficiently more than the rate of flow of incoming sewage that the excess flow will cause a sufficient velocity across the bottom of the aerator to keep mixed liquor solids from depositing on the bottom of this chamber.

The continuous and automatic return of mixed liquor solids as provided by this process keeps these solids fresh and the biological life active. The environmental conditions for biological life remains constant because there is provided a uniform mixing of incoming sewage and returned mixed liquor solids with the mixed liquor all along the length of the aerator.

The percentage of suspended solids in the aeration chamber 39 preferably should be kept at about 15 times the percentage suspended solids in the incoming sewage, but this solids concentration may be varied over a wide range depending upon a number of variable conditions including, detention periods, the rate of air supply and the characteristics of the sewage or waste liquor to be treated.

To lower the solids concentration in the aeration chamber mixed liquor may be wasted either to the primary or secondary clarifiers or direct to the sludge digester. To raise the solids concentration sludge may be returned from the final clarifier. At a given detention period in the concentrator-clarifier chamber 48 just sufficient solids will settle to the bottom and be automatically returned to the aerator to maintain the desired solids concentration in this chamber.

Where only sufficient detention period is provided in the concentrator-clarifier chamber to maintain the desired mixed liquor concentration in the aerator the effluent liquor from the concentrator-clarifier will carry with it a certain amount of suspended settleable solids which may be removed by passing the liquor through the secondary clarifier chamber 54. It has been found, however, that satisfactory sewage treatment results can be obtained with this process without the use of secondary clarifier 54 provided that the concentrator-clarifier 48 is designed to give adequate settling capacity. Excellent results have been obtained with this process using only 30 minutes detention in the concentrator-clarifier. However, due to the variable characteristics of sewage and waste liquors a detention period of one hour or more may be required for adequate clarification.

Sludge digester 19 may be used for the digestion of sludge solids removed from the various tanks or treatment units during the process of sewage and waste treatment. The capacity of the digester should be sufficient to retain the sludge solids for a period of at least 30 days if the digester is equipped with means for keeping the sludge warm. A considerably longer detention period will be necessary for proper digestion should the sludge not be kept warm.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. An improved activated sludge system for treating sewage comprising, in combination, a pair of chambers having a common partition wall and a common communication at their tops and bottoms, aerating means in one, the first chamber, the second chamber having means therein for effecting settling, sewage supply means connected to the first chamber, a discharge means from the second chamber, the aerating means being juxtapositioned to the bottom of the first chamber and near the upstream wall thereof, and having upwardly directed discharge arranged to effect cycle of the liquid contents of the first chamber for aeration and ejection purposes by causing the upward flow to continue at the upper level toward the downstream wall of the chamber, a weir disposed at the top of said common partition wall and providing the top communication between said first and second chambers, and positioned to effect the entrance over said weir of circulating mixed liquor from the first chamber into the second chamber, the bottom of the second chamber being inclined downwardly toward the first chamber and spaced apart from the bottom of said partition wall to form a bottom communication between the two chambers whereby settling solids are returned from the second chamber to the first chamber, said aerating means being disposed remote from the second chamber to effect downward movement of the liquid adjacent to and on both sides of the partition wall for effecting the removal of settling solids from the second chamber, and the continuous uniform mixing and circulation of these solids with the liquid contents of the first chamber.

2. An improved activated sludge system as defined by claim 1 wherein there is provided deflecting baffle means in the second chamber downstream from the inlet thereof whereby coagulation, sedimentation and return of settling solids to the first chamber is improved.

3. An improved activated sludge system as defined by claim 1 wherein the weir in the top communication is adjustable for regulating the rate of circulating flow from the first chamber to the second chamber.

4. An improved activated sludge system as defined by claim 1 wherein the weir in the top communication is adjustable for regulating the rate of circulating flow from the first chamber to the second chamber, and deflecting baffle means in the second chamber downstream from the inlet thereof whereby coagulation, sedimentation and the return of settling solids to the first chamber is improved.

5. An activated sludge system defined by claim 1 wherein there is provided a supply channel in the chamber containing the aeration means and in the upper portion thereof, the aerating means being disposed below the said supply channel and near the bottom of said aeration chamber and the bottom of said channel having an opening forming a restricted throat, the aeration means discharging upwardly to the upper portion of the aeration chamber, the bottom and throat being disposed relative to the aerating means for effecting liquid circulation in the chamber and ejection of liquid from the channel through the restricted throat.

6. In an activating sludge system for treating sewage and similar waste liquors, an aeration chamber having a supply channel juxtapositioned thereto and in the upper portion thereof, aerating means in and juxtapositioned to the bottom of the inlet side of the chamber and positioned below the bottom of said supply channel for effecting aeration of the liquid circulation, the bottom of said channel having an opening therein forming a restricted throat and the aerating means discharging upwardly to the upper portion of the chamber whereby aerating responsive liquid circulation in the chamber across the opening effects ejection of the liquid from the channel through the restricted throat, communication means between the aeration chamber and the supply channel adjacent to the top of said channel to provide communication near the upper liquid levels of each whereby a portion of the circulating liquid in the aeration chamber is returnable to the supply channel to recirculate through said channel and mix with the incoming sewage to effect better distribution and mixing of the incoming sewage with the liquid contents of the aeration chamber.

7. An improved activated sludge system for treating sewage comprising in combination a chamber, a partition wall therein defining aerator and clarifier portions and a secondary clarifier chamber, the aerator-clarifier portions of the first chamber having communication at their tops and at their bottoms, aerating means juxtapositioned to the bottom of the aerator portion and disposed to effect cycling of the liquid contents of said aerator portion for aerating and ejector purpose, means in the clarifier portion for effecting clarification and settling, the top communication between said portions comprising a weir located near the top of said first mentioned chamber and in the partition wall for determining the upper liquid levels of said portions when filled whereby circulating mixed liquor from the aerator portion may enter and flow through the clarifier portion, the bottom communication between said portions being formed by inclined walls and providing an opening through which settling solids are returned from the clarifier portion to the aerator portion, the aerating means being disposed adjacent the intake side of the aerator portion and remote from the clarifier portion and effecting downward movement of liquid adjacent to and on both sides of the partition wall for effecting the removal of settling solids from the clarifier portion and the continuous return, uniform mixing and circulation of these solids with the liquid contents of the aerator portion, and means for applying the partly clarified effluent from the aerator-clarifier portions including chamber to the secondary clarifier chamber for additional clarification.

8. A system as defined by claim 7, characterized by the addition of means in the first chamber for effecting a change in the percent solids concentration in the aeration liquor.

9. A system as defined by claim 7, characterized by the addition of return means for regulating the percent solids concentration in the aeration liquor, said means comprising means for returning sludge from the secondary clarifier chamber to the aerator portion to increase the percent solids concentration.

10. A system as defined by claim 7, characterized by the addition of drainage means for regulating the percent solids concentration in the aerator liquor wherein the aerator may be regulated, said means being adapted to drain a portion of the liquid of the aerator to lower the percent solids concentration.

11. An activated sludge system as defined by claim 1 wherein there is provided a supply channel located in the upper portion of the chamber containing the aerating means, said supply channel having a top and bottom communication means with the aerating chamber, the bottom of the supply channel having an opening forming the bottom communication means, the opening comprising a restricted throat, the top communication means comprising a weir located in the top of a partition wall and determining liquid levels of each portion, the aerating means being located in juxtaposition to the restricted throat to effect outward flow of mixed liquor in the aerating chamber adjacent the supply channel for ejection of liquid from the supply channel through the restricted throat and whereby a portion of the mixed liquor in the aeration chamber is returnable through the top communication means to the supply channel for recirculation through said channel and mixing with the incoming sewage to effect better mixing and distribution of the incoming sewage with the liquid contents of the aerating chamber.

ROBERT R. BAXTER.
MARTIN A. MILLING.

(References on following page)

REFERENCES CITED

The following references are of record in the file of this patent:

UNITED STATES PATENTS

| Number | Name | Date |
|---|---|---|
| 1,139,024 | Frank | May 11, 1915 |
| 1,717,780 | Imhoff | June 18, 1929 |
| 1,870,435 | Baker | Aug. 9, 1932 |
| 1,900,809 | Hammerly | Mar. 7, 1933 |
| 1,902,078 | Jenks | Mar. 21, 1933 |
| 2,225,437 | Nordell | Dec. 17, 1940 |
| 2,370,974 | Langdon | Mar. 6, 1945 |
| 2,388,795 | Montgomery et al. | Nov. 13, 1945 |
| 2,389,357 | Griffith | Nov. 20, 1945 |
| 2,415,048 | Sharp | Jan. 28, 1947 |
| 2,419,492 | Green | Apr. 22, 1947 |

FOREIGN PATENTS

| Number | Country | Date |
|---|---|---|
| 105,654 | Great Britain | Apr. 26, 1917 |
| 506.337 | Germany | Sept. 2, 1930 |